Feb. 19, 1952 R. M. KANIK 2,586,055
MACHINE FOR MAKING MANIFOLD FORMS OR PADS
Filed May 13, 1949 4 Sheets-Sheet 1

INVENTOR.
RUDOLPH M. KANIK
BY
Bodell + Thompson
ATTORNEYS

Feb. 19, 1952 R. M. KANIK 2,586,055
MACHINE FOR MAKING MANIFOLD FORMS OR PADS
Filed May 13, 1949 4 Sheets-Sheet 2

INVENTOR.
RUDOLPH M. KANIK
BY Bodell + Thompson
ATTORNEYS

Feb. 19, 1952  R. M. KANIK  2,586,055
MACHINE FOR MAKING MANIFOLD FORMS OR PADS
Filed May 13, 1949  4 Sheets-Sheet 3
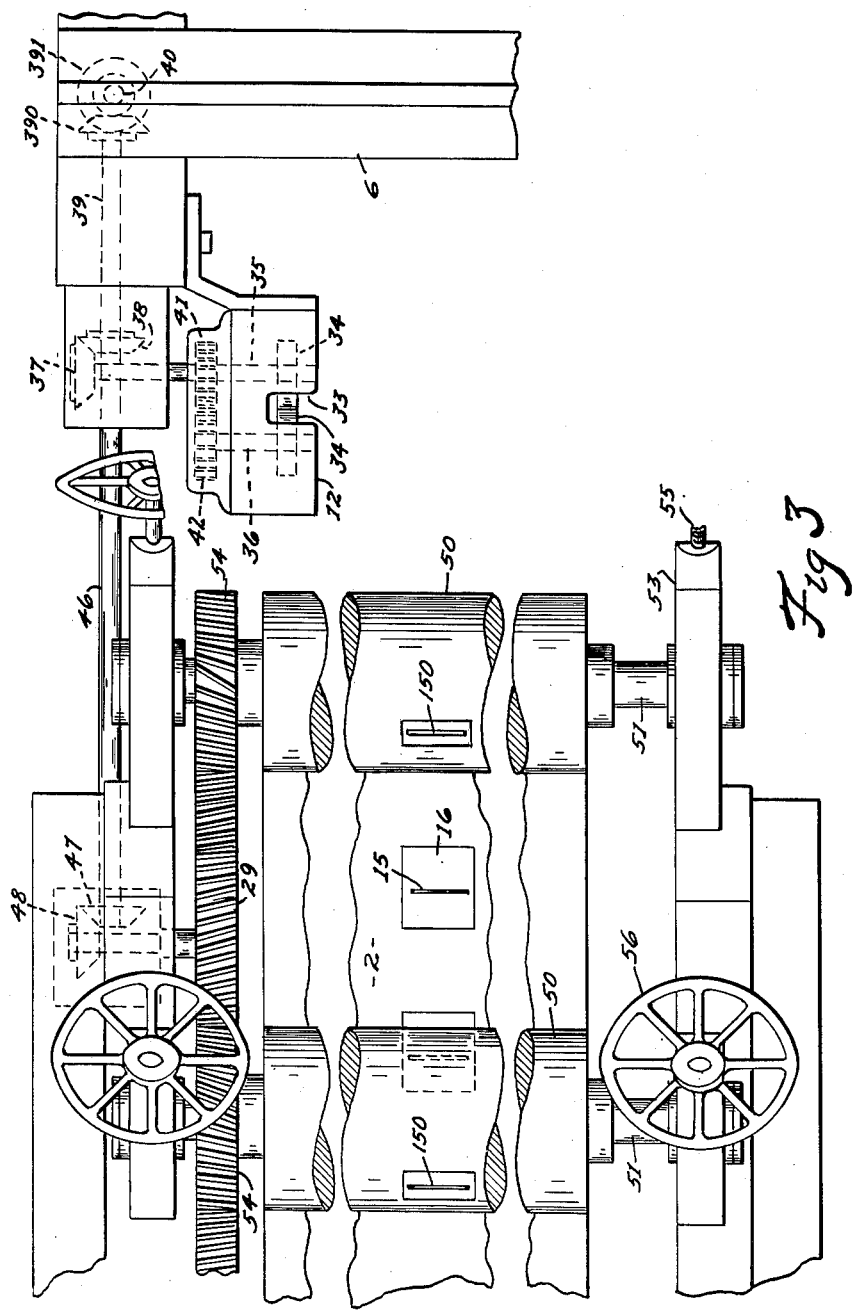
INVENTOR.
RUDOLPH M. KANIK
BY
Bodell & Thompson
ATTORNEYS

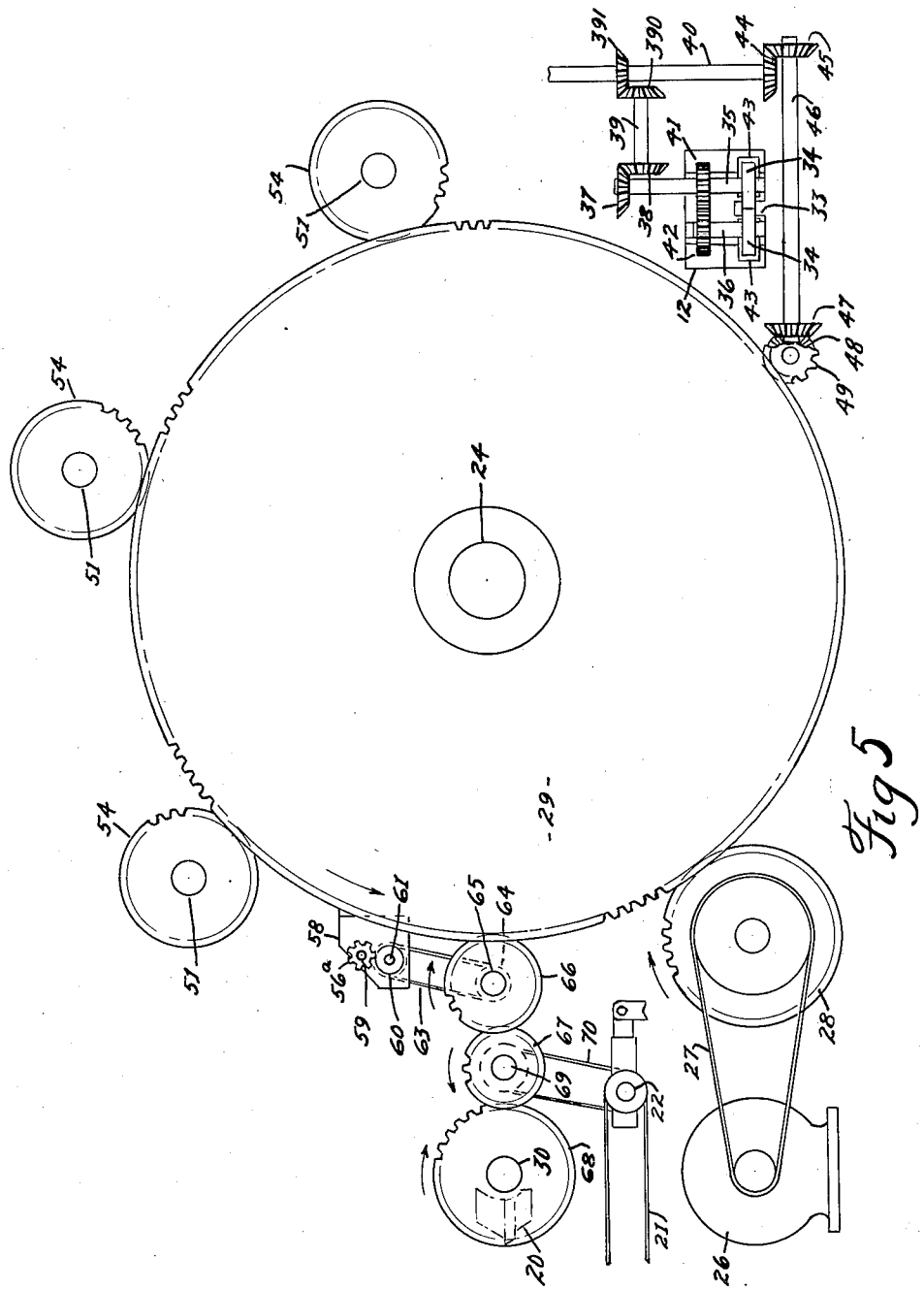

Patented Feb. 19, 1952

2,586,055

UNITED STATES PATENT OFFICE 2,586,055

MACHINE FOR MAKING MANIFOLD
FORMS OR PADS

Rudolph M. Kanik, Black River, N. Y.

Application May 13, 1949, Serial No. 93,159

1 Claim. (Cl. 270—52)

This invention relates to machines for making manifold forms or pads consisting of sets or groups of alternate record sheets and transfer or carbon sheets assembled from rolls of strips of record and transfer strips before being cut into individual pads.

It has for its object a machine by which the strips are drawn by a feed roll from the supporting rolls and lie in superposed relation, one upon the other, on a portion of the feed roll, the feed roll having means on its periphery, as blades, spaced apart at regular intervals to puncture the superposed strips and apply sufficient tension thereto to initially draw them off the supporting rolls, and a knife operating to sever the strips after they have left the feed roll in superposed relation, the knife cutting in line with the incisions made by the blades. The blades are spaced apart a distance equal to the width of the finished pads. The machine also embodies means for securing together, as by adhesive, the lapping margins of the superposed strips along one end margin or edge of the pad, that is along like side margins or edges of the assembled strips. This margin or edge is at one end of the finished pad.

Heretofore, in making manifold forms of this type, the supporting rolls have been power operated and the strips fed from the rolls and guided or alined by feeding mechanism which includes a sprocket wheel entering perforations pre-formed along the entire length of like lapped side margins of the strips, and the perforated margins are afterwards cut off. The perforated margins are therefore waste material extending the full length of the strips.

By this invention, the formation of this waste material is eliminated and the strips are drawn from the supporting rolls by a feed roll applying tension to the strips to draw the strips off the supporting rolls, and the assembled strips, after passing from the feed roll, cut into individual pads of a definite width. The strips are secured, or glued, together along like margins or along like edges thereof into pad formation while passing to the feed roll, or after passing from the feed roll before the strips are cut up into individual pads.

When the pad is formed by gluing together lapping margins of the sheets or strip, the edges of the strip are not glued and a perforated tearing line is formed to facilitate tearing off of the sheets, leaving a remnant or stub consisting of the lapping margins. When the edges are glued, there is no remnant or stubs.

The invention consists in the novel features and in the combinations and constructions hereinafter set forth and claimed.

In describing this invention, reference is had to the accompanying drawing in which like characters designate corresponding parts in all the views.

Figure 3 is a fragmentary plan view of parts seen in Figure 2.

Figure 5 is a diagrammatic view of the actuating mechanism.

Figure 1:
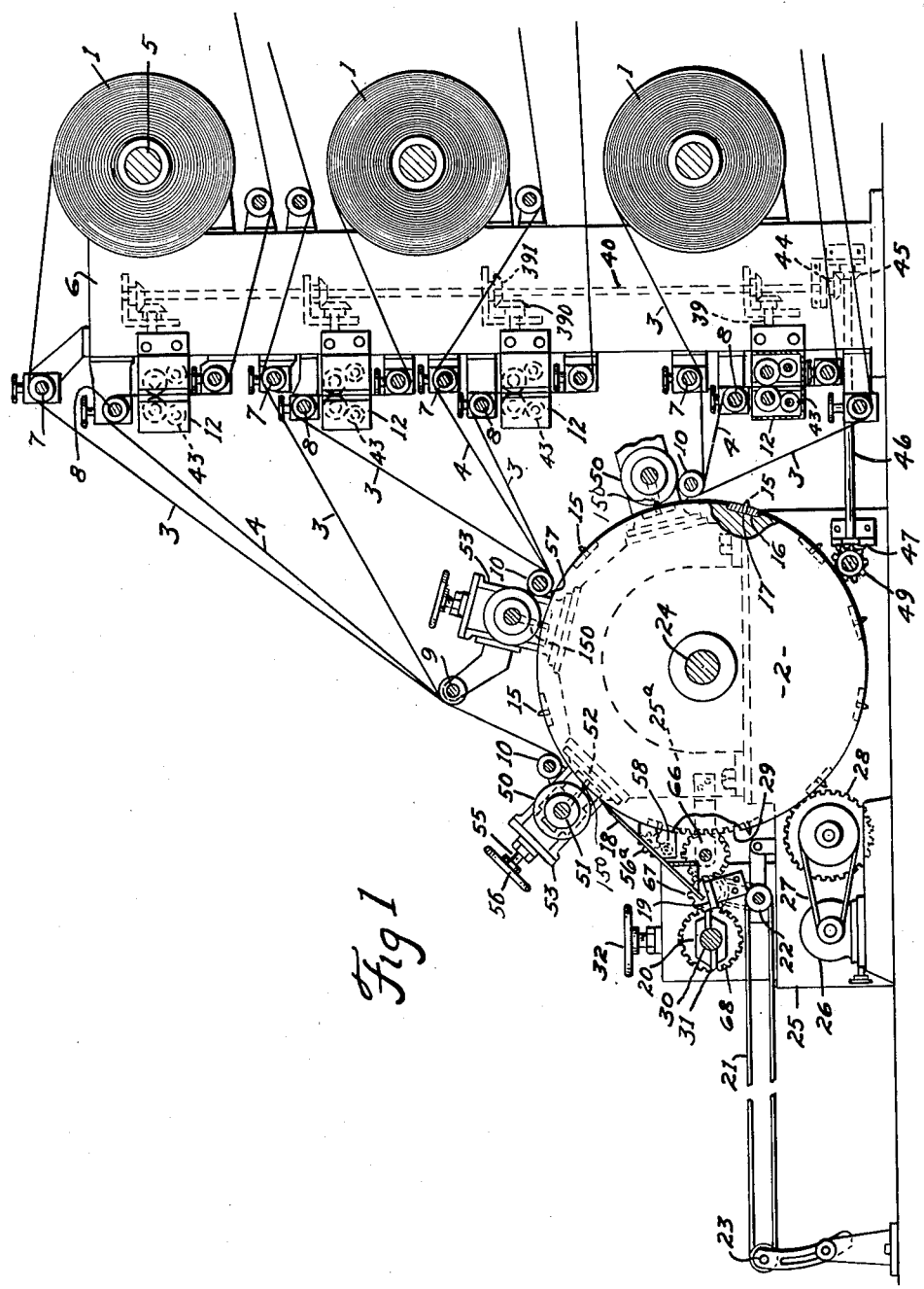
Figure 1 is a fragmentary side elevation, partly in section, of a machine embodying this invention.
Figure 2:
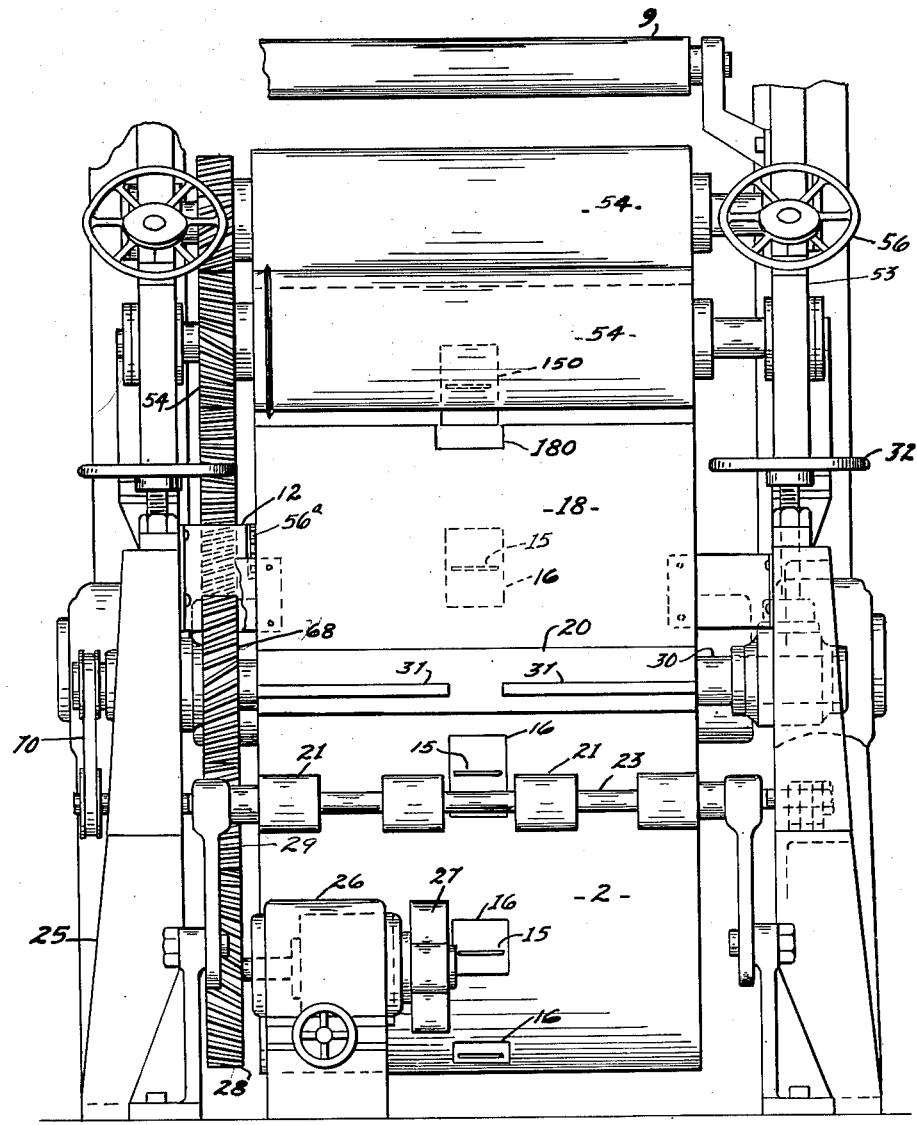
Figure 2 is an enlarged fragmentary front elevation looking to the right in Figure 1.
Figure 4:
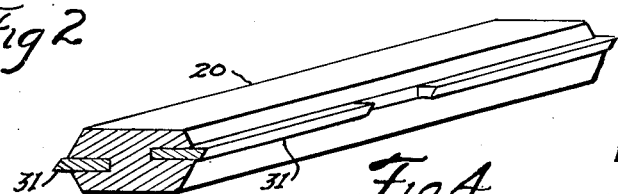
Figure 4 is a detail isometric view of the knife for cutting the strips into individual pads.

The machine comprises, generally, supporting rolls for strips to be formed into pads or manifolds, a power operated feed roll over a portion of the periphery of which the strips are passed, one upon the other, the feed roll having means, as blades, for puncturing the superposed strips in order to apply at least an initial pulling tension to the strips during the rotation of the feed roll, the puncturing means being spaced apart at regular intervals a distance equal to the width of the finished pad, and means for cutting off the superposed strips into individual pads in transverse lines alined with the punctures made by the puncturing or traction applying means; with means for gluing together either the superposed sheets along like margins, or the like edges thereof, either as the strips are fed to the feed roller, or after they leave the feed roller and before the cutting off operation.

The machine also comprises compression rolls coacting with the feed roll and the assembled strips thereon to feed the assembled strip and relieve the strips of the pull of the knives, the compression rolls being power operated in synchronism with the feed roll. The glue applying means and the cutting off means are also power operated in synchronism with the feed roll and preferably, from the feed roll.

I designates supporting rolls for the strips, these strips being arranged in sets or groups of record and transfer strips, the transfer strips being located between the record strips. Each set or group consists of a master record strip and one or more duplicate record strips with transfer or carbon paper strips between the record strips.

2 designates the feed roll. 3 and 4 designate strips of record and transfer sheets coming from the different rolls I. The different sets or groups of strips 3, 4, approach the roll 2 in different tangential directions.

The supporting rolls 1 are mounted on suitable axles 5 mounted in the frame 6, and the strips 3, 4, are guided, as by sets of rollers 7 and 8 carried by the frame. The supporting rolls for one only of the strips of each group are shown, as the rolls for the master strips, the rolls for the remaining strips being substantially the same. The strips are also guided by additional rollers 9 and 10, the rollers 10 being located close to the periphery of the feed roll in different radial angles. As the feed roll 2 rotates, the strips are brought into superposed relation to each other and pass tangentially off the roll 2 to the knife, to be described, which cuts the superposed strips up into individual pads of equal width. During the passage of the strips to the feed roll, the lapping margins of some of the intermediate strip or strips of each set, that is the transfer strips, may have glue applied thereto as from glue pots 12, or the assembled strips, when passing from the roll 2, may have glue applied to like edges thereof to form the pad, instead of gluing together lapping margins of the strips.

The puncturing means on the feed roll, as here shown, comprises blades 15 mounted in bases 16 inserted in recesses 17 in the periphery of the feed roll 2, the blades extending radially and lengthwise of the feed roll and being of considerable less width than the strips, or than the length of the feed roll 2. The blades are spaced a predetermined distance apart, this distance being determined by the width of the pad to be formed. The blades are here shown as located midway between the ends of the roll 2. During the rotation of the feed roll 2, the blades puncture the strips 3, 4, of the several groups one by one as the groups approach the roll 2 and thus apply a pulling tension to the strips sufficient to feed them off the supporting rolls 1. The blades are relieved of this work by the compression rolls to be described. After the groups have been assembled, or piled one on the other, the assembled strips pass from the feed roll 2 tangentially over a plate or platform 18. The blades pull out of the strips in a path which is substantially at a right angle to the assembled strips as the assembled strips leave the feed roll in the tangential direction. The plate 18 is formed with a notch 180 providing a clearance for the blades 15. During the passage of the strips to the feed roll 2, glue may be applied to opposite faces of like margins of the intermediate strip or strips of each group, as the transfer strips 4, in the event like lapped side margins of the strips are to be glued together, or alternately, glue may be applied to like edges of the assembled strips when passing from the feed roll. The assembled strips are fed across a shearing edge 19 located at the lower edge of the tangential plate 18, where assembled strips are cut off by a movable knife 20, the knife 20 being located to cut the strips along a transverse line coincident with the incisions made by the blades 15. The individual severed pads, when cut off, drop onto a suitable conveyor 21 consisting of a belt running over rolls on shafts 22, 23.

The feed roll 2 is suitably mounted on an axle 24 carried by a frame element 25a and it is actuated by power, as an electric motor 26, which actuates by a belt and pulley, designated generally 27, a gear 28 meshing with a gear 29 at one end of the axle shaft 24 for the feed roll 2. The knife 20 is shown as mounted on a rotating shaft 30 suitably mounted in the frame and having diametrically extending blades 31 which coact with the shearing edge 19. The blades are here shown as in two sections axially located in alinement with the incision cut by the blades 15. The knife is supported in the frame element 25a to be adjusted to coact most efficiently with the shearing edge, by adjusting screws 32.

The glue pots 12 are shown as located to apply lines of glue to the opposite faces of each transfer sheet 4 so as to glue the margin thereof to the margin of the adjacent master and duplicate record sheets 3 of each group. The glue pots 12 may be of any suitable construction and as here shown, the sheets 4 are arranged so that one margin thereof passes upwardly vertically through external slots 33, Figure 3, between a pair of glue applying rollers 34 in the glue pot. The rollers 34 extending through holes in the upper ends of the side walls of the slots 33 in order to contact opposite faces of the margins of the strips 4. The rollers 34 are mounted on suitable shafts 35, 36, mounted in the glue box. The shaft 35 is a drive shaft, it having an extension provided with a bevel gear 37 meshing with a companion bevel gear 38 on a shaft 39 having a bevel gear 390 meshing with a gear 391 on an upright drive shaft 40. The shafts 35, 36, are connected by intermeshing gears 41, 42. The glue applying rollers 34 coact with idler rollers 43 in the bottom of the glue pot. They act to apply the glue to the rollers 34. The drive shaft 40 is connected through gears 44, 45, with a shaft 46 connected through bevel gears 47 and 48, and gear 49 with the feed roll gear 29, the gear 49 meshing with the gear 29. Thus, the speed of the glue applying rollers 34 is synchronized with, or in proportion to, the speed of the feed roll 2.

50 designates power operated compression rolls coacting with the feed roll 2 to press the assembled strips on the feed roll and to relieve the blades 15 of most of the work of unwinding the strips from the supporting rolls 1. There is one compression roll 50 for each set or group of strips 3, 4, 3, the rolls 50 being spaced circumferentially around the feed roll 1. The compression rolls 50 are mounted on shafts 51, each journalled at its ends in boxes or bearing blocks 52 adjustable radially of the roll 1 in brackets 53 carried by the frame elements 25a. The shafts 51 have gears 54 thereon meshing with the feed roll gear 29. Thus, the compression rolls are synchronized with the feed roll 1. The bearing blocks 52 are adjusted to carry the compression rolls radially relative to the feed roll 1 by screws 55 having hand wheels 56. The compression rolls are provided with a clearance groove 150 for the cutting edges of the blade 15.

The guide rollers 10, which are located adjacent the periphery of the feed roll 2, are carried by arms 57 on the brackets 53.

When the pads to be formed are glued together at the edges instead of their lapping margins, the glue pots 12 are not used, but glue is applied to the edges of the assembled sheets before they are cut off, but when on the plate 18 by a glue applying wheel 56a dipping in a glue pot 58, Figures 1 and 5, and wiping on the edges of the sheets, the wheel 56a being actuated in any suitable manner from the gear 29.

As shown, the glue applying wheel 56a is mounted on a shaft 59 mounted in the wall of the glue pot 58 and coacting with a roller 60 in the glue pot to be turned thereby. The roller 60 is mounted on a shaft 61 mounted in a wall of the glue box, the shaft having a pulley outside the glue box over which runs a belt 63, which also runs over a pulley 64 on a shaft 65 carried in the frame of the machine, and on which is mounted a gear 66 meshing with the feed roll gear 29. The gear 66 is one of a train of gears for actuating the knife shaft 30. The shaft 30, on which the knife 20 is mounted, is actuated from the gear 29 of the feed roll through a train of gears 66, 67, 68. The ratio of the gears 66, 67, 68 is such as to actuate and time the knife in synchronism with the feeding of the assembled strips by the roll 2 so that the knife cuts off the finished pads in line with the incisions made by the blades 15. Thus, the gearing for the glue pots 12 and the gearing for the knife 20 is synchronized with the speed of the feed roll 2 and the spacing of the blades 15 spaced apart a distance equal to the width of the pad to be produced.

The conveyor belt 21 is actuated from the shaft 69 on which the gear 67 is mounted, as by a belt 70 running over pulleys on the shaft 69 and on the shaft 22 for the roll at one end of the conveyor belt.

In operation, as the groups of sheets 3, 4, 3, approach the feed roll 2, the blades 15 puncture the sheets and apply sufficient tension thereto to start unwinding the sheets from the supporting rolls 1. The glue is applied to the sheets to form the sheets into pads, as described, and as the assembled sheets feed from the feed roll 2, they are compressed by the compression rolls 50 and feed over the plate 18 and cut off into pads of predetermined widths by the knife 20. As the knife 20 cuts in alinement with the incisions produced by the blades 15, there is no excess or waste material.

What I claim is:

A machine for making manifold forms comprising a frame having supports for rolls of strips, and a power operated feed roll carried by the frame, over a portion of the periphery of which the strips are passed one upon the other, the feed roll having cutting blades projecting radially at intervals therefrom arranged to cut transverse incisions in the strips at a right angle to the side margins of the strips with respect to the direction of feeding movement, the blades serving as teeth to apply a pulling tension to the strips, the blades being located intermediate of the ends of the feed roll and hence intermediate of the side margins of the strips, and knives carried by the frame and spaced from the feed roll in the direction of the feeding movement of the strips, and arranged to sever the strips transversely in a line coincident with the incisions made by the blades, and actuating mechanism for the feed roll and the knives.

RUDOLPH M. KANIK.

REFERENCES CITED

The following references are of record in the file of this patent:

UNITED STATES PATENTS

| Number | Name | Date |
|---|---|---|
| 852,429 | Gauch | May 7, 1907 |
| 1,400,631 | Smith | Dec. 20, 1921 |
| 2,144,331 | Fulk | Jan. 17, 1939 |
| 2,177,675 | Sherman | Oct. 31, 1939 |
| 2,327,689 | Wyrick | Aug. 24, 1943 |
| 2,482,613 | Erickson | Sept. 20, 1949 |